United States Patent
Li et al.

(10) Patent No.: US 7,733,883 B2
(45) Date of Patent: Jun. 8, 2010

(54) METHOD FOR IMPLEMENTING A VIRTUAL LEASED LINE

(75) Inventors: Bin Li, Guangdong Province (CN); Defeng Li, Guangdong Province (CN)

(73) Assignee: Huawei Technologies Co., Ltd., Guangdong Province (CN)

( * ) Notice: Subject to any disclaimer, the term of this patent is extended or adjusted under 35 U.S.C. 154(b) by 593 days.

(21) Appl. No.: 10/587,538

(22) PCT Filed: Jan. 28, 2005

(86) PCT No.: PCT/CN2005/000120

§ 371 (c)(1),
(2), (4) Date: Jul. 25, 2006

(87) PCT Pub. No.: WO2005/078994

PCT Pub. Date: Aug. 25, 2005

(65) Prior Publication Data
US 2007/0115913 A1 May 24, 2007

(30) Foreign Application Priority Data
Feb. 7, 2004 (CN) .......................... 2004 1 0004119

(51) Int. Cl.
*H04L 12/28* (2006.01)
(52) U.S. Cl. ........................................ 370/401; 709/249
(58) Field of Classification Search ................. 370/268, 370/401; 709/249
See application file for complete search history.

(56) References Cited

U.S. PATENT DOCUMENTS

| 6,374,303 | B1 * | 4/2002 | Armitage et al. | 709/242 |
| 7,095,740 | B1 * | 8/2006 | Jagannath et al. | 370/392 |
| 7,130,926 | B1 * | 10/2006 | Wu et al. | 709/250 |
| 7,136,374 | B1 * | 11/2006 | Kompella | 370/352 |
| 7,260,097 | B2 * | 8/2007 | Casey | 370/392 |
| 7,411,904 | B2 * | 8/2008 | Foote et al. | 370/230 |
| 7,430,210 | B2 * | 9/2008 | Havala et al. | 370/395.53 |
| 2001/0049739 | A1 * | 12/2001 | Wakayama et al. | 709/230 |

(Continued)

FOREIGN PATENT DOCUMENTS

JP 2002-77261 A 3/2002

(Continued)

OTHER PUBLICATIONS

Method to Set up LSP using VLAN Tag Switching Authors: T. Kawakami, G. Velev Matsushita, N. Ogashiwa Jaist, H. Ogawa Jun. 2003.*

(Continued)

*Primary Examiner*—Pankaj Kumar
*Assistant Examiner*—Ajay P Cattungal
(74) *Attorney, Agent, or Firm*—Ladas & Parry, LLP

(57) ABSTRACT

A method for implementing a virtual leased line (VLL) is provided. The method includes the steps of: configuring a virtual local area network (VLAN) label stack on the basis of VLAN QinQ technique; configuring a VLAN QinQ switching device and a multi-protocol label switching device to communicate with each other; extending a label distribution protocol (LDP) to support encapsulation of VLAN labels, so as to carry out VLAN label assignment and take the extended LDP as a topology discovery protocol for an L2 virtual private network; setting the range of VLAN labels; implementing a VLL by constructing a VLAN switching path.

8 Claims, 5 Drawing Sheets

U.S. PATENT DOCUMENTS

| | | | | |
|---|---|---|---|---|
| 2003/0018820 A1* | 1/2003 | Ould-Brahim et al. | ...... | 709/249 |
| 2003/0026209 A1* | 2/2003 | Katz | .......................... | 370/238 |
| 2003/0133412 A1* | 7/2003 | Iyer et al. | ................... | 370/235 |
| 2003/0142674 A1 | 7/2003 | Casey | .......................... | 370/393 |
| 2003/0152075 A1 | 8/2003 | Hawthorne, III et al. | .... | 370/389 |
| 2004/0202171 A1* | 10/2004 | Hama | ...................... | 370/395.1 |

FOREIGN PATENT DOCUMENTS

| | | | |
|---|---|---|---|
| WO | 01/80485 | A2 | 12/2001 |

OTHER PUBLICATIONS

Brockners, F., et al., "Metro Ethernet—Deplowying the Extended Campus Using Ethernet Technology," *Local Computer Networks, 2003. LCn '03. Proceedings.28th Annual IEEE International Conference* on Oct. 20-24, 2003, Piscataway, NJ, USA (Oct. 2003).

Kawakami, T., et al., "Method to Set Up LSP Using VLAN Tag Switching," CCAMP Working Group, IETF Standard-Working-Draft, Internet Engineering Task Force (Jun. 2006).

* cited by examiner

L2 PDU: data link layer message

T: tunnel label

V: VC label

T': the outer layer label will be replaced during the forwarding process

| DA (6B) | SA (6B) | ETYPE (8100) (2B) | Subscriber VLAN tag (2B) | ETYPE (2B) | DATA (0-1500byte) | FCS (4B) |
|---|---|---|---|---|---|---|

| DA (6B) | SA (6B) | ETYPE (8100) (2B) | Tag of VLAN3 | ETYPE (8100) (2B) | Subscriber VLAN tag (2B) | ETYPE (2B) | DATA (0-1500byte) | FCS (4B) |
|---|---|---|---|---|---|---|---|---|

US 7,733,883 B2

METHOD FOR IMPLEMENTING A VIRTUAL LEASED LINE

CROSS-REFERENCE TO RELATED APPLICATIONS

This application is the U.S. National Stage of International Patent Application No. PCT/CN2005/000120, filed on Jan. 28, 2005, which claims priority to Chinese Patent Application No. 200410004119.2, filed on Feb. 7, 2004, the disclosure of which is incorporated herein by reference.

FIELD OF THE INVENTION

The present invention relates to implementation of virtual private network, particularly to a method for implementing a virtual leased line in a virtual private network.

BACKGROUND OF THE INVENTION

Through more than 30 years of development, Transmission Control Protocol/Internet Protocol (TCP/IP) -based Ethernet technique has become a dominating LAN technique. It has entered into the core networks of the public networks, taken root in metropolitan area network, and is impregnating into public access networks. For each application, Ethernet technique has become a de facto transport protocol standard. Due to its simplicity, flexibility and low cost, Ethernet technique is by far superior to traditional techniques, such as Token Ring, Fiber Distributed Data Interface (FDDI), and Asynchronous Transfer Mode (ATM).

As Ethernet-based Local Area Network (LAN) and Ethernet switching technique develop, Virtual Local Area Network (VLAN) has occurred. VLAN is a technique for LAN segmentation based on LAN switch technology, as defined in Institute of Electrical and Electronics Engineers (IEEE) 802.1Q.

At the same time, as Ethernet technique develops, it is desirable for IP networks to provide not only traditional e-mail and access services but also end-to-end forwarding control and Quality of Service (QoS), etc. Wherein, Multi-Protocol Label Switching (MPLS) is a technique to speed up message forwarding based on labels between link layer packet headers and network layer packet headers, developed on the basis of IP technique in conjunction with ATM technique in recent years. It is compatible to diverse network techniques and link layer techniques, and has been widely used in Virtual Private Networking (VPN), Traffic Engineering (TE), and QoS fields, etc.

In MPLS technique, the label is a length-fixed 4-byte short identifier with local meaning, located between the link layer packet header and the network layer packet header, designed to identify a Forwarding Equivalence Class (FEC). Wherein, FEC refers to a collection of destination address prefixes or host addresses with identical forwarding characteristics, which are included in one and the same class and assigned with the same label during label assignment under Label Distribution Protocol (LDP). The label of a specific packet represents the FEC assigned to the packet. The encapsulation structure of the label is shown in FIG. 1. Wherein, Label represents the label value, 20 bits, used as a pointer for message forwarding; the Time to Live (TTL) of a packet is 8-bit long and has the same meaning as the TTL in IP packets; Exp is 3-bit long and is reserved for experimentation; S is 1-bit long and indicates the layer where the multi-layer label is ("1" indicates a label is on the bottommost layer). The label can be encapsulated in the packet at either of two positions: SHIM mode and Asynchronous Transfer Mode/Frame Relay (ATM/FR) mode, as shown in FIG. 2.

The decision of binding a specific label to a specific FEC is made by a downstream Label Switch Router (LSR); then, the downstream LSR notifies the upstream LSR; that is to say, the label is assigned by a downstream LSR, and label binding is distributed along the direction from downstream to upstream. Label distribution may be in autonomous label distribution mode (the downstream LSR carries out label assignment and distribution automatically, without the need to obtain any label request message from the upstream LSR) or in on-demand label distribution mode (the downstream LSR carries out label assignment and distribution when it obtains a label request message from the upstream LSR). Label holding may be in either of two modes: free label holding mode and conserved label holding mode. For a specific FEC, when the upstream LSR (Upstream Router, abbreviated as "Ru") receives a label binding from the downstream LSR (Downstream Router, abbreviated as "Rd") and finds the Rd is not the next hop of the Ru, it means the Ru uses free label holding mode if the Ru stores the binding; if the Ru discards the binding, it means the Ru uses conserved label holding mode. Free label holding mode can be used if LSR is required to quickly adapt to route variations; conserved label holding mode can be used if LSR is required to store a small number of labels.

As shown in FIG. 3, the basic constituent elements of a MPLS network are LSRs 10-1, 10-2, . . . , 10-9; a network comprised of LSRs is referred to as a MPLS domain. LSRs located at the edge of a MPLS domain and connected to other subscriber networks are called edge LSRs, for example, LSRs 10-1, 10-2, 10-5, 10-8, and 10-9 shown in FIG. 3 are edge LSRs; LSRs in a MPLS domain are called core LSRs, for example, LSRs 10-3, 10-4, 10-6, and 10-7 are core LSRs. Core LSRs can be routers that support MPLS or ATM-LSRs that are upgraded from ATM switches. Packets assigned with a label are transmitted along Label Switched Paths (LSP) formed by a series of LSRs; wherein the ingress LSR is called Ingress, and the egress LSR is called Egress. The path formed by the connection of LSRs 10-2, 10-3, 10-4, and 10-5 shown in FIG. 3 is an LSP, with LSR 10-2 as Ingress and LSR 10-5 as Egress.

At Ingress, packets entering into the network are classified into FECs by their characteristics. Usually, packets are classified into FECs by IP address prefix or host address. Packets with the same FEC will be transmitted along the same path (i.e., the same LSP) in the MPLS domain. Each LSR assigns a short and length-fixed label to each incoming FEC packet and then forwards the packet from a corresponding interface.

An I/O label mapping table is created in each LSR along the LSP; the elements of the table are called Next Hop Label Forwarding Entry (NHLFE). For a labeled packet received, a LSR finds the corresponding NHLFE in the table in accordance with the label, replaces the original label with a new label, and then forwards the labeled packet; the process is called Incoming Label Map (ILM). NHLFE contains other necessary information (e.g., link layer encapsulation information), besides the next hop label.

In MPLS, the FEC assignment for a specific packet is performed at ingress of the network, and the subsequent LSRs only forward the packet simply, which is much simpler than traditional forwarding on network layer; therefore, the forwarding speed can be improved.

MPLS is of great significance to implementation of Traffic Engineering. It can implement all Traffic Engineering functions that are supported in other models, but the cost is much lower; to be more important, it can implement partial automation of Traffic Engineering functions. Presently, Resource Reservation Protocol (RSVP)-Traffic Engineering (TE) is usually used to support MPLS TE, which is extended for Traffic Engineering on the basis of RSVP. In RSVP-TE, the major messages include PATH and RESV, both of which are extended from corresponding messages in RSVP. The PATH and RESV messages in RSVP-TE mainly include the following objects: Label Request Object designed to request a label to the downstream direction, Explicit Route Object designed to designate a stringent or loose explicit route, Label Object designed to provide a label in the upstream direction, Record Route Object designed to log the passing route for loop detection, Traffic Engineering Session Attribute Object designed to control the LSP, and Tspec Object designed to specify the configuration of bandwidth resource. Besides extending message objects, RSVP-TE can also be improved by massage merge technique, MESSAGE-ID technique, summary refresh technique, and HELLO protocol extension technique.

MPLS also supports LSP Tunnel technique. In an LSP, LSR Ru and LSR Rd serve as an upstream router and a downstream router for each other; however, the path between LSR Ru and LSR Rd may not be a part of the path provided under the routing protocol; MPLS supports setting up a new LSP <Ru R1 ... Rn Rd> between LSR Ru and LSR Rd, with LSR Ru and LSR Rd as the origin and terminal of the LSP, respectively. The LSP between LSR Ru and LSR Rd is the LSP tunnel, which avoids the traditional network layer encapsulation tunnel. If the route of the tunnel is identical to the route obtained from the routing protocol hop by hop, this tunnel is called a hop-by-hop route tunnel; otherwise the tunnel is called an explicit route tunnel. When a packet is transmitted in an LSP tunnel, the packet will have multi-layer labels. At the ingress and egress of a tunnel, label stack push and pop operations will be carried out, respectively; after each push operation, the label will be added with one layer. MPLS has no restriction on the depth of the label stack. As shown in FIG. 4, LSP <R2 R21 R22 R3> is a tunnel between R2 and R3.

Label Distribute Protocol (LDP) is used to set up LSPs, i.e., it binds the FEC with a label, and notifies the neighboring LSR in the LSP of the binding. LDP defines the message interaction process and message structure between LSRs, as well as the routing mode. Neighboring LSRs can find each other by sending a Hello message periodically, and then sets up an LDP session to the neighboring LSR detected. Via the LDP session, neighboring LSRs notify information to each other, such as label switching mode, label space, value of session hold timer, etc. An LDP session is a TCP connection and has to be maintained by means of LDP messages. If there is no any other LDP message within the time limit specified by the session hold timer, a session hold message must be sent to maintain the LDP session. MPLS also supports Constrain-Based Routing LDP (CR-LDP). CR-LDP means some constraint information is added to the LSP route in the label request message when the ingress node initiates an LSP setup request. The constraint information can be exact nomination for the LSRs along the path (here, the route is called stringent explicit route) or blur restriction on selection of downstream LSRs (here, the route is called loose explicit route).

In a MPLS network, Virtual Leased Line (VLL) technique refers to private virtual channels established by subscriber networks distributed in different regions via the network resources provided by a network provider, so that the subscriber networks can communicate with each other via the established private virtual channels (i.e., VLL). In VLL, the network provider doesn't participate in maintenance of network routes; instead, the network provider only provides interconnections on link layer between the subscriber networks in different regions and ensures privacy of the subscriber networks during communication; such services are often classified into Layer 2 (L2) VPN.

At present, there are mainly three technical solutions for implementation of VLL, described as follows:

Presently, VLL can be implemented by means of a point-to-point MPLS L2 VPN, i.e., the network operator provides L2 connectivity for the subscribers but doesn't participate in route calculation for VPN subscribers. In short, MPLS L2 VPN transmits the subscribers' L2 data over an MPLS network transparently. From the viewpoint of subscribers, the MPLS network is an L2 switching network, in which the subscribers can establish L2 connections between different sites. In an L2 VPN, since the service provider doesn't participate in routing, privacy of the customers' routes can be ensured automatically. In ATM, for example, each Customer Edge Router (CE) is configured with an ATM virtual circuit connected to a remote CE via the MPLS network; the process is identical to the process of implementing interconnection via an ATM network. The networking schematic diagram of MPLS L2 VPN is shown in FIG. 5.

An L2 VPN can be implemented by extending Multi-Protocol Border Gateway Protocol (MP-BGP) or extending LDP. The frame encapsulation modes are identical in the two implementation solutions, referring to "draft-martini-12circuit-encap-mpls-04" for the implementations.

VLL implementation solution 1:

An L2 VPN implemented by extending Multi-Protocol Border Gateway Protocol (MP-BGP) is referred to as Kompella MPLS L2 VPN. In a KompellaMPLS L2 VPN, Customer Edge Routers (CEs), Provider Edge Routers (PEs) and Provider Routers (P) employ the same operating principle as the routers in BGP/MPLS VPN, i.e., they employ the label stack to implement transparent transmission of subscriber messages in the MPLS network. Wherein, the outer layer label (i.e., Tunnel label) is used to transmit a message from a PE to another PE; the inner layer label (i.e., VC label) is used to distinguish connections in different VPNs, so that the receiving party can decide the destination CE of the message in accordance with the VC label. The variations of the message label stack during the forwarding process are shown in FIG. 6. See draft-kompella-ppvpn-12vpn-02 for implementation of Kompella MPLS L2 VPN.

VLL implementation solution 2:

An L2 VPN implemented by extending LDP is called Martini MPLS L2 VPN. It emphasizes on how to solve the problem of establishing a Virtual Channel (VC) between two CEs. Martini MPLS L2 VPN employs VC-TYPE+VC-ID to identify VCs, wherein, VC-TYPE indicates the type of VC is ATM, VLAN, or Point-to-Point Protocol (PPP), while VC-ID is used to identify a VC uniquely. In all VCs of one and the same VC-TYPE, a VC-ID is unique in the entire SP network; the PEs that connects any two of CEs switch VC labels in LDP and bind the corresponding CEs by the VC-ID. After the LSP that connects two PEs is established and the label switching and binding process are completed, a VC is established, and accordingly the two CEs can transmit L2 data via the VC. In order to support VC label switching between PEs, in the Martini Draft, LDP is extended to include an FEC type (VC FEC). Furthermore, since two PEs that switch VC labels are not directly connected to each other, LDP has to set up the session on the remote peer layer and transmit VC FEC and VC labels on this session. In the VLL implemented in the approach, LDP message is used to transmit Virtual Channel (VC) information. A remote session is established between PEs in LDP, and PEs assign a VC label for each connection between CEs. L2 VPN messages carry a VC label and are forwarded to the opposite PE involved in the remote session via the LSP established in LDP. In this way, a VC LSP is established over a common LSP actually. At the Ingress PE, the data packet is attached with an inner layer VC label and then an LSP label before it enters into the LSP; in this way, when the data packet arrives at the Egress PE, the LSP label is removed, and the destination VC is determined in accordance with the VC label; therefore, the data packet is forwarded to the correct CE. Configuring a VC connection in this approach requires configuring a unidirectional connection at the two PEs respectively. See draft-martini-l2circuit-trans-mpls-10 for implementation of Martini MPLS L2 VPN.

VLL implementation solution 3:

VLAN technique is used to implement VPN. It is based on IEEE 802.1Q encapsulation protocol—VLAN QinQ technique, the core idea of which is to encapsulate private network VLAN tags into public network VLAN tags and thus transmit messages carrying two layers of tags via the service provider's backbone network, and thereby provide the subscribers with simpler L2 VPN tunnels. QinQ protocol is a simple and easy-to-manage protocol. It doesn't need support of signaling; instead, it maintains tunnels with static configuration and is especially suitable for small Intranets with L3 switches as backbone or small-scale metropolitan area networks. FIG. 7 shows a network based on traditional IEEE 802.1Q protocol. The configuration method shown in FIG. 7 requires that the subscribers' VLANs be visible in the backbone network; therefore, it not only consumes precious VLAN ID resource of the service provider but also requires the service provider to manage the subscribers' VLAN IDs; as a result, the subscribers have no right to plan their VLANs by themselves. In order to solve above problem, QinQ protocol provides a unique public network VLAN ID for each subscriber, encapsulates the subscriber's private network VLAN tag into the new public network VLAN ID, and transmits the subscriber's data with the public network VLAN ID in the public network; as a result, the subscriber's private network VLAN ID is concealed in the public network; thereby, the previous VLAN ID resource of the service provider can be saved greatly, as shown in FIG. 8. The public network only needs to assign a VLAN ID 3 to the subscriber. No matter how many private network VLAN IDs are planned in the subscriber's network, when a subscriber message with a tag enters into the service provider's backbone network, the newly-assigned public network VLAN ID is added in the message; with the public network VLAN ID the subscriber message can pass through the backbone network and arrive at the PE at opposite end of the backbone network; at the PE, the public network VLAN tag is removed from the message, so that the message is recovered to the original subscriber message, and then is sent to the destination CE. Therefore, each of the messages transmitted in the backbone network has two layers of 802.1Q tag headers: one is the public network tag, the other is the private network tag. Since the outgoing port of CE1 is a Trunk port, each of the messages sent from the subscriber to PE1 carries a VLAN tag (in 200-300 range) of the subscriber's private network, as shown in FIG. 9; after the message enters into PE1, PE1 doesn't care about the VLAN tag of the subscriber's private network since the incoming port is a QinQ access port; instead, PE1 inserts the default VLAN 3 tag of the incoming port into the subscriber's message, as shown in FIG. 10; in the backbone network, the message is transmitted along the Trunk VLAN 3 port, and the tag of the subscriber private network is kept in transparent state in the backbone network, till the message arrives at PE2; when PE2 finds the port connected to CE2 is the access port of VLAN 3, it removes VLAN 3 tag header from the message in accordance with the traditional 802.1Q protocol and recovers the message to the original subscriber message, and then sends the message to CE2. The recovered original message is identical to that shown in FIG. 9.

The VLL implementation solutions described in implementation solutions 1 and 2 employs an MPLS label-based switching mechanism, and the protocol is complex; furthermore, due to existence of two layers of MPLS labels and two Ethernet link layer frame headers, the overhead resulted from message encapsulation is heavy; in implementation solution 3, the labels are configured statically, as a result, the label configuration and maintenance workload will be heavy if the network scale is large.

SUMMARY OF THE INVENTION

An aspect of the present invention aims to provide a method for implementing a virtual leased line, so as to take full advantages of the prior equipment, simplify label configuration work and reduce maintenance workload on the basis of simple message encapsulation and low overhead.

A method for implementing a virtual leased line, according to an aspect of the present invention, includes the steps of:

configuring a virtual local area network (VLAN) label stack on the basis of VLAN QinQ technique;

configuring a VLAN QinQ switching device and a multi-protocol label switching (MPLS) device to communicate with each other;

extending a label distribution protocol (LDP) to Support encapsulation of VLAN labels, so as to carry out VLAN label assignment and take the extended LDP as a topology discovery protocol for an L2 virtual private network;

setting the range of VLAN labels;

implementing a VLL by constructing a VLAN switching path.

Preferably, the VLAN label stack is configured into a structure with one layer; or the VLAN label stack is configured into a structure with two or more layers, with labels in the outermost two layers in VLAN QinQ format and labels in other layers in MPLS format.

Preferably, the step of configuring a VLAN QinQ switching device and an MPLS device to communicate with each other further includes the sub-steps of:

if the VLAN QinQ switching device is at upstream, accomplishing conversion from VLAN QinQ encapsulation to MPLS encapsulation at the outgoing interface of the VLAN QinQ switching device;

if the VLAN QinQ switching device is at downstream, assigning an MPLS label with the same range as VLAN labels to the upstream MPLS device by the VLAN QinQ switching device, identifying the MPLS label at the incoming interface of the VLAN QinQ switching device, and treating the label as a VLAN label, with the upstream MPLS device not modified.

Preferably, the step of configuring a VLAN QinQ switching device and an MPLS device to communicate with each other further includes the sub-steps of:

if the VLAN QinQ switching device is at upstream, accomplishing conversion from VLAN QinQ encapsulation to MPLS encapsulation at the outgoing interface of the VLAN QinQ switching device;

if the VLAN QinQ switching device is at downstream, assigning a VLAN label to the upstream MPLS device by the VLAN QinQ switching device, with the upstream MPLS device modified to support the VLAN QinQ encapsulation.

Preferably, in the step of extending an LDP to support encapsulation of VLAN labels, so as to carry out VLAN label assignment and take the extended LDP as a topology discovery protocol for an L2 virtual private network, a VLAN label type length value used to carry the VLAN label is set in a label map message, so as to assign a VLAN label to an upstream device.

Preferably, identical VLAN labels entering via different interfaces are treated as different labels.

Preferably, the VLAN QinQ switching device notifies a neighboring device that it is a VLAN QinQ switching device by adding a session parameter carrying the VLAN label range used by the VLAN QinQ switching device in an LDP initialization message.

Preferably, after LDP initialization, the VLAN QinQ switching device assigns a VLAN label value within the set range when assigning a VLAN label to the neighboring device.

Preferably, in the step of setting the range of VLAN labels, the VLAN label range setting is implemented by adding a VLAN label request object that carries the VLAN label range value in a Resource Reservation Protocol-Traffic Engineering PATH message.

Preferably, in the step of implementing a VLL by constructing a VLAN switching path, the VLAN switching path is constructed with a tunnel multiplexing mechanism.

The method for implementing a VLL according to the aspect of the present invention utilizes VLAN labels for switching and implements a VLL by extending MPLS, and has the following advantages.

First, the method for implementing a VLL according to the aspect of the present invention is featured with simple protocol, low overhead resulted from message encapsulation, and easy configuration and maintenance; second, the solution according to the aspect of the present invention implements a QinQ VLAN switched VLL by extending MPLS, and, because all prior devices of different manufactures support MPLS signaling protocol, it is easy to get supports from the manufactures; third, the solution according to the aspect of the present invention employs MPLS protocol, therefore, upgrade can be convenient and services can be deployed quickly by modifying the prior protocols simply.

DETAILED DESCRIPTION OF THE EMBODIMENTS

Hereinafter the embodiment according to the present invention is further described in detail with reference to the attached drawings.

In view of the current situation of MANs (i.e., Ethernet switches are widely used), the method for implementing a VLL according to an embodiment of the present invention implements a VLL on the basis of VLAN label switching and extension of MPLS, utilizing the characteristics of Ethernet technique and focusing on technical simplicity and universality, with VLAN switching and localization as the fundamental principle. The solution according to an embodiment of the present invention utilizes the VLAN ID in Ethernet 802.1Q encapsulation as a label, employs QinQ technique to implement a two-layer label stack, utilizes Ethernet frame header to encapsulate the payload, extends the MPLS protocol to implement the VLAN label assignment, and implements intercommunication with the prior three technical solutions with reference to conventional MPLS-related and matured prior arts, to ensure requirements in some aspects such as Traffic Engineering.

Figure 1:
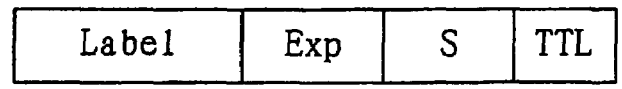
FIG. 1 is a diagram of the label encapsulation structure in MPLS technique.
Figure 2:
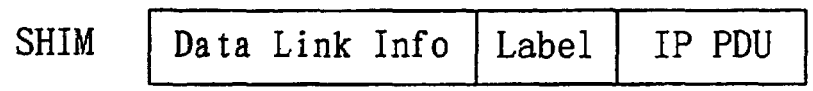
FIG. 2 is a diagram of the encapsulation position of label in a packet in MPLS technique.
Figure 2:
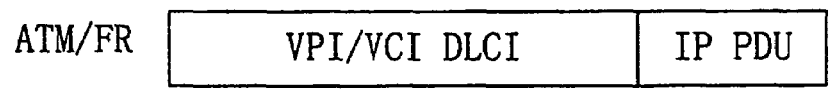
Figure 3:
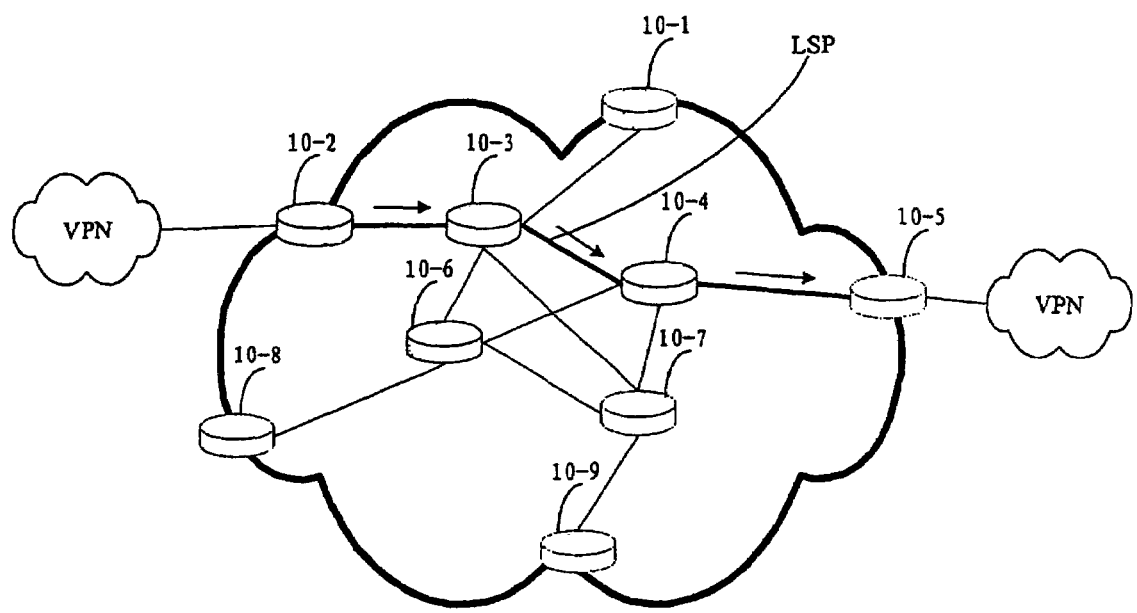
FIG. 3 is a diagram of architecture of a MPLS network.
Figure 4:
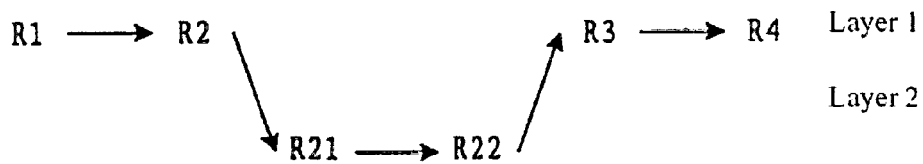
FIG. 4 is a diagram of implementation of an LSP tunnel in MPLS technique.
Figure 5:
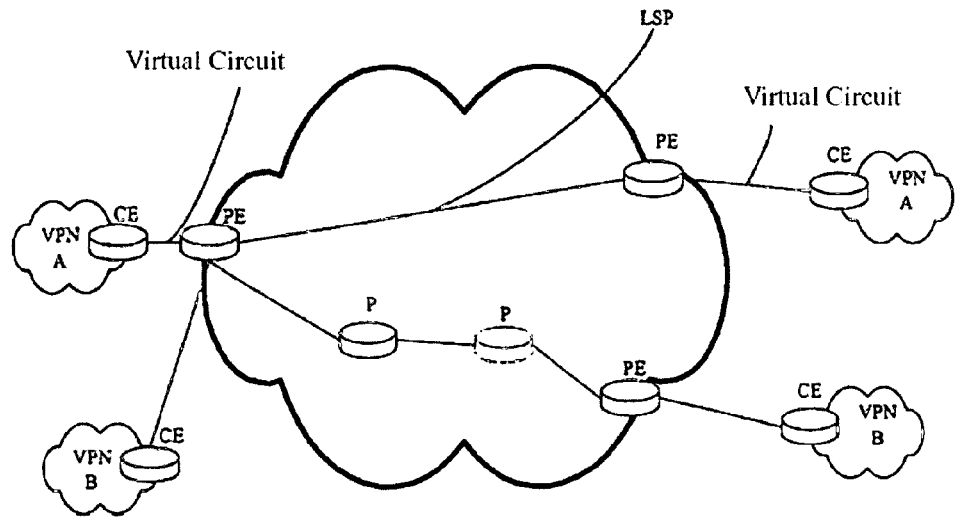
FIG. 5 is a diagram of MPLS L2 VPN networking.
Figure 6:
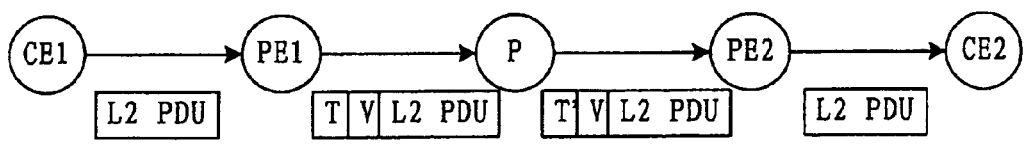
FIG. 6 is a diagram of message label stack variations during message forwarding process in the VLL implementation solution in Kompella MPLS L2 VPN mode.
Figure 7:
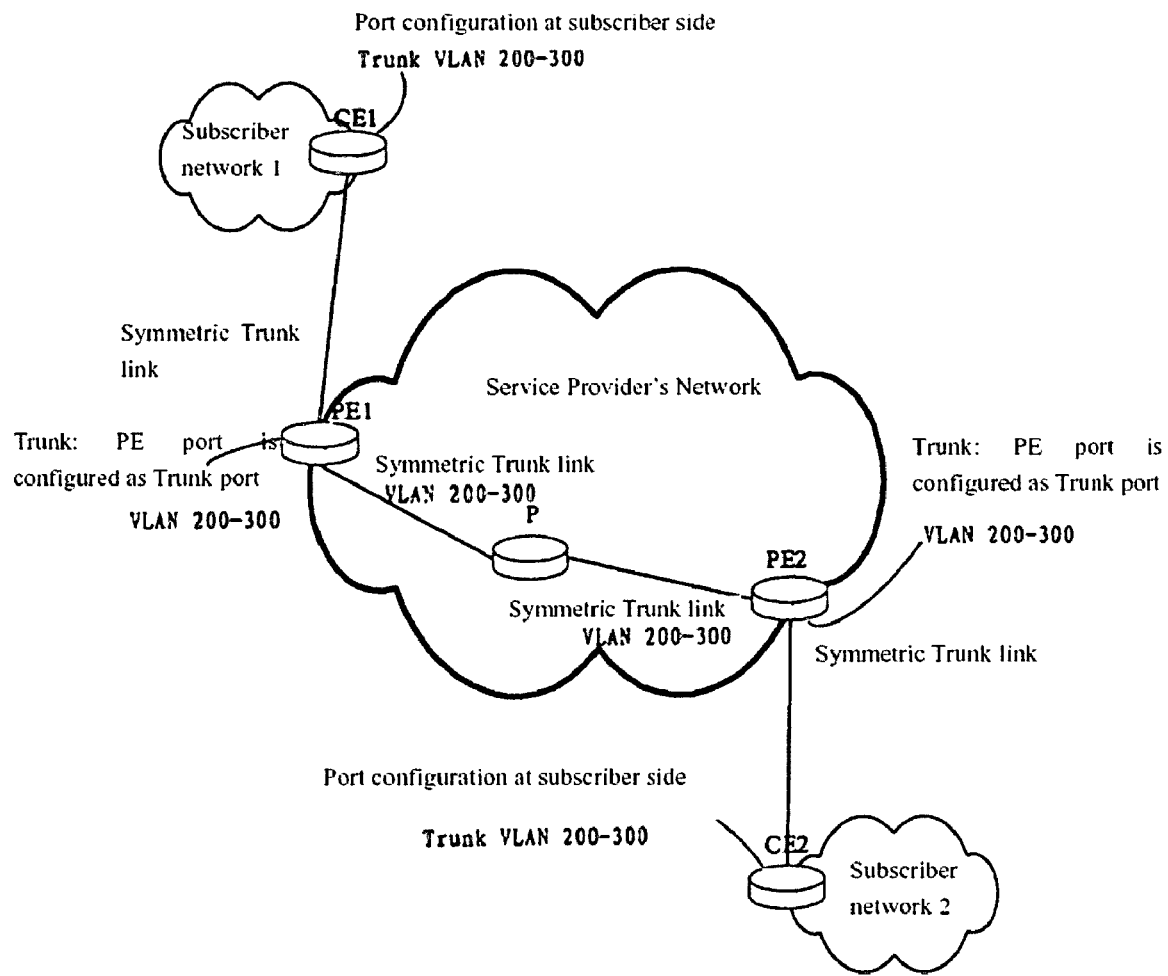
FIG. 7 is a diagram of a traditional IEEE 802.1Q-based network.
Figures 8, 9, 10:
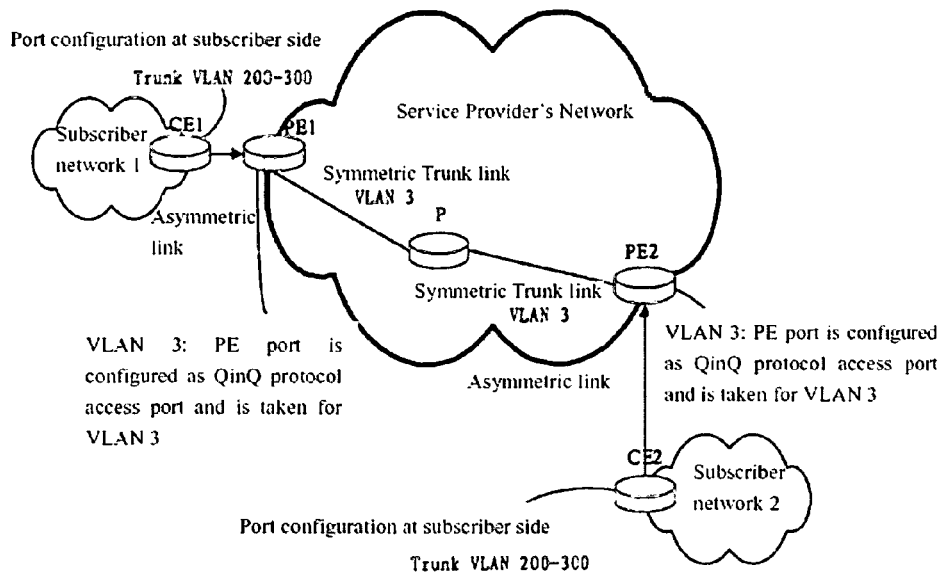
FIG. 8 is a typical networking diagram of VLL implementation in QinQ protocol.
FIG. 9 is a diagram of encapsulation of a message sent from the subscriber to PE1 in the VLL implementation in QinQ protocol.
FIG. 10 is a diagram of message encapsulation in PE1 in the VLL implementation in QinQ protocol.
Figure 11:
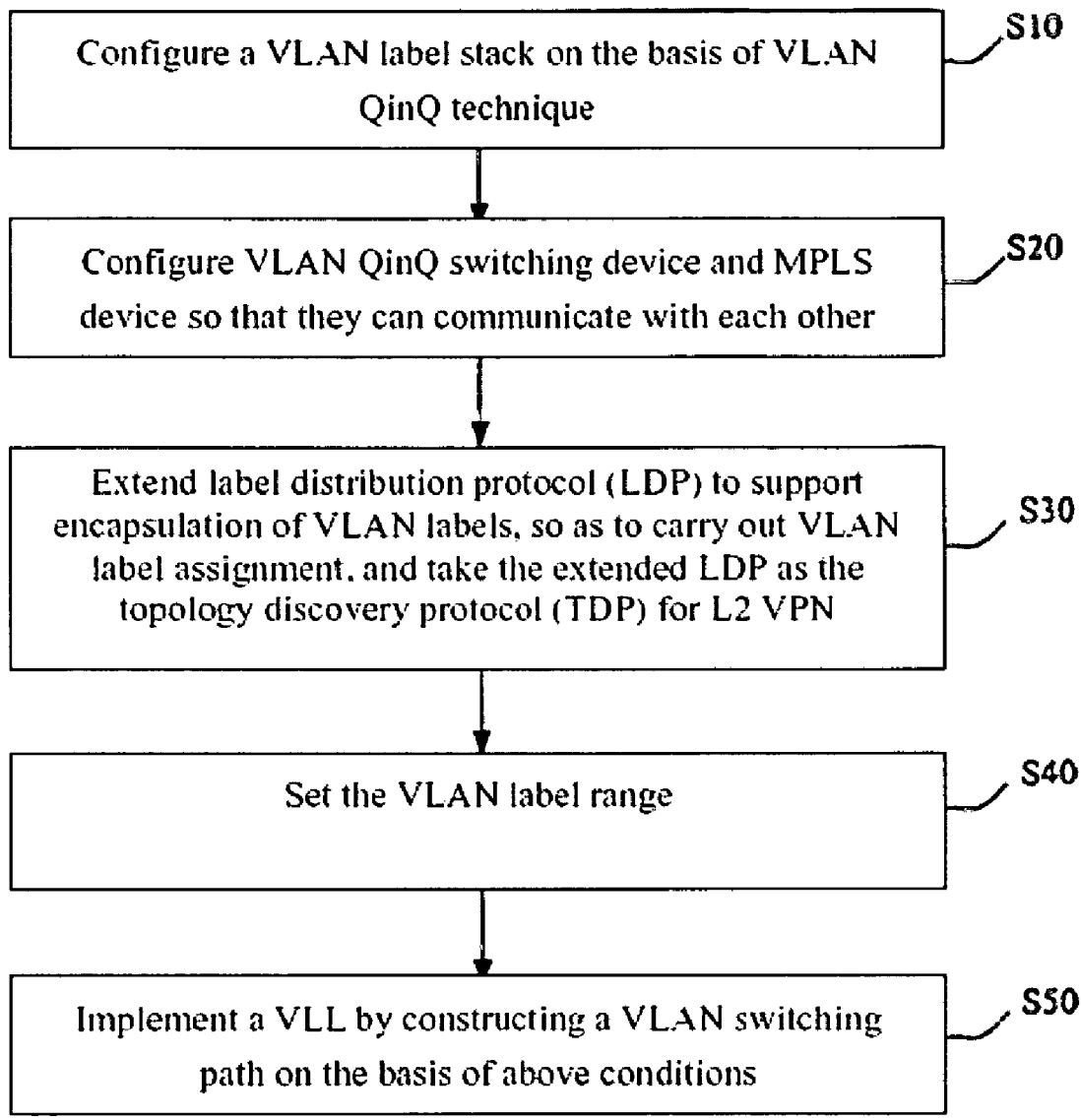
FIG. 11 is a flow diagram of the principle for the method for implementing VLLs according to an embodiment of the present invention.

FIG. 11 is a flow diagram of the principle for the method for implementing VLLs according to an embodiment of the present invention; the major implementation procedures are as follows:

Step S10: a VLAN label stack is configured with VLAN QinQ technique. In the solution according to the embodiment of the present invention, VLAN QinQ technique is used to implement the VLAN label stack. At present, QinQ technique supports 2-layer VLAN label stack; of course, extension to unlimited layers can be considered, or, the VLAN label stack can be configured to support only one-layer VLAN labels, while other labels can be MPLS labels. In the VLAN label stack, the outermost two layers of labels can be in QinQ format, and the rest labels can be MPLS labels; wherein, configuring VLAN label stack with QinQ technique has been described in the background of the invention. Therefore, it is not detailed any more.

Step S20: a VLAN QinQ switching device and an MPLS device are configured to communicate with each other, i.e., in the network system, the neighboring devices of the VLAN QinQ switching device are configured to support MPLS, and thereby accomplish switching between VLAN labels and MPLS labels;

Wherein, in order to enable intercommunication between the VLAN QinQ switching device and the MPLS device so as to support switching between VLAN labels and MPLS labels, it can be permitted that the devices neighboring to the VLAN QinQ switching device (herein, the VLAN QinQ switching device is referred to as dynamic QinQ switching device) are MPLS devices that don't support QinQ, wherein the neighboring devices are configured by the extended MPLS protocols. In this way, if the dynamic QinQ switching device is located at upstream, conversion from QinQ encapsulation to MPLS encapsulation has to be accomplished at the outgoing interface of the dynamic QinQ switching device. If the dynamic QinQ switching device is located at downstream, there are two possible solutions:

One Solution: the upstream MPLS device is not modified; while, MPLS labels are identified and treated as VLAN labels at the incoming interface of the dynamic QinQ switching device.

In this case, the dynamic QinQ switching device assigns an MPLS label to the upstream device. The range of the assigned MPLS labels is identical to that of VLAN labels, i.e., 0-4095.

The other solution: the upstream MPLS device is modified to support QinQ label encapsulation. In this case, the downstream dynamic QinQ switching device assigns a VLAN label to the upstream device.

Step S30: the LDP is extended to encapsulate VLAN labels, so as to distribute the VLAN labels and use the extended LDP as the topology discovery protocol in L2 VPN.

In the embodiment of the present invention, standard LDP is extended to take two roles in the MPLS network: one role is used as a label distribution protocol; the other role is used as a topology discovery protocol in L2 VPN. In a preferred embodiment of the present invention, in order to support VLAN switching, the prior LDP is to be extended to provide above two functions. The extension of LDP can be implemented by defining a new Type Length Value (TLV) in an LDP message; the Type Length Value is referred to as the VLAN Label TLV. The format of the newly defined TLV is as follows:

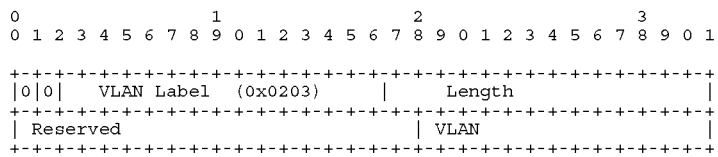

Wherein, in the TLV format, the first 32 bits are standard, and the VLAN label is defined as 0x0203 temporarily, which has to be submitted to the Internet Assigned Numbers Authority (IANA) for approval; in the rest 32 bits, only 12 bits are used to identify the VLAN label value (0-4095), and the other bits are reserved. The VLAN Label TLV is encapsulated in a label map message and is used to assign a VLAN label to the upstream device.

Step S40: the range of VLAN labels is set, i.e., VLAN labels are taken as a new label type (0-4095). Since the number of VLAN labels is small, it is proposed that the label space should be determined per interface. Hereinafter this part of the solution according to an embodiment of the present invention is described.

In a preferred embodiment of the present invention, a new label type (i.e., VLAN label, the range is 0-4095) is defined. In the forwarding plane, the specification for the VLAN label is identical to that for IEEE 802.1Q, i.e., the length of VLAN label is still 12 bits. Due to the limited VLAN value range, the label space per interface has to be supported. Therefore, in a preferred embodiment of the present invention, identical VLAN labels entering via different interfaces are treated as different labels. The label space per platform is optional. Since the dynamically allocated VLAN labels are used for L2 transparent transmission, it is unnecessary to set TTL for them, i.e., it is unnecessary to support MPLS TTL. The loop detection can be implemented by the signaling plane.

In order to implement VLAN label negotiation with a neighboring device, the device that employs VLAN label has to notify the neighboring device that the VLAN label device employs VLAN labels and request the neighboring device to assign a VLAN label to the VLAN label device. In the LDP initialization message, the VLAN label device shall notify the neighboring device that the VLAN label device is a VLAN QinQ switching device and request the neighboring device to assign a VLAN label to it.

To this end, an optional parameter (referred to as VLAN session parameter) has to be added to the LDP initialization message, in order to implement VLAN label negotiation between the VLAN label device and the neighboring device. The label is notified by the downstream device to the upstream device, and thus the VLAN QinQ switching device has to notify the neighboring device that the VLAN QinQ switching device employs VLAN labels; that is to say, the VLAN QinQ switching device has to force the neighboring device to assign a VLAN label to it. The format of the optional parameter TLV is as follows:

| Type | 0x0503 |
|------|--------|
| Length | 8 bytes |
| Value | See the following definition |

Wherein, the "Value" is defined as follows:

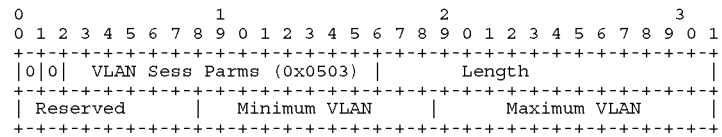

Usually, some of "VLAN" s have to be reserved for special purposes. Therefore, it is necessary to define the range of VLAN labels. If the VLAN QinQ switching device assigns a label to the neighboring device with LDP initialization message after initialization, a VLAN label value within the defined range is used.

Wherein, the VLAN label assignment and range value setting can be implemented by modifying the label distribution part of Resource Reservation Protocol-Traffic Engineering (RSVP-TE); as for the TE part, the prior standard can be inherited without modification.

Wherein, the requirement for modification of label distribution part of RSVP-TE is identical to that for the extension of LDP protocol. Then, the modified RSVP-TE can be used to assign VLAN labels and negotiate the VLAN label range.

Wherein, the negotiation of the VLAN label range through the modified RSVP-TE can be performed by adding a Label Request Object in the PATH message. That is to say, a Label Request Object type (referred to as "VLAN Label Request") is added, in the following format:

Class=19, C-Type=4

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|            Reserved           |             LSPID             |
+-+-+-+-+-+-+-+-+-+-+-+-+-+-+-+-+-+-+-+-+-+-+-+-+-+-+-+-+-+-+-+-+
|   Reserved    |  Minimum VLAN  |         Maximum VLAN         |
+-+-+-+-+-+-+-+-+-+-+-+-+-+-+-+-+-+-+-+-+-+-+-+-+-+-+-+-+-+-+-+-+
```

In this way, after the upstream device declares the VLAN label range supported by it to the downstream device, the downstream device can assign a VLAN label within the specified range to the upstream device through a PATH message of the modified RESV-TE.

Step S50: based on the setting conditions and foundation in steps S10, S20, S30 and S40, VLLs can be implemented by constructing VLAN LSPs, i.e., the VLANs between any two subscribers are connected via the constructed VLAN LSPs. In a preferred embodiment of the present invention, VLAN LSPs can be constructed with a tunnel multiplexing mechanism. In the prior art, two layers of labels have to be encapsulated for a message: Tunnel label and VC label. Wherein, the VC label is assigned by the egress PE to the ingress PE and can be implemented in LDP. In a preferred embodiment of the present invention, QinQ technique can be used to encapsulate two layers of labels for a message: the VC label is in the format of the VLAN label, which is assigned in LDP; the extension is identical to that described above.

VLLs can be implemented via the steps S10-S50.

Though the present invention is illustrated and described with reference to some preferred embodiments, those skilled in the art shall understand that diverse modifications can be made in forms and details to the present invention without departing from the spirit and scope of the present invention that are defined by the attached claims.

What is claimed is:

1. A method for implementing a virtual leased line (VLL), comprising the steps of:
    configuring a virtual local area network (VLAN) label stack on the basis of VLAN QinQ;
    configuring a VLAN QinQ switching device and a multi-protocol label switching (MPLS) device to communicate with each other and implementing switching between VLAN labels and MPLS labels;
    extending a label distribution protocol (LDP) to support encapsulation of VLAN labels, so as to carry out VLAN label assignment and take the extended LDP as a topology discovery protocol for an L2 virtual private network;
    setting the range of VLAN labels;
    implementing a VLL by constructing a VLAN switching path;
    wherein the step of configuring the VLAN QinQ switching device and the MPLS device to communicate with each other further comprises the sub-steps of:
    if the VLAN QinQ switching device is at upstream, accomplishing conversion from VLAN QinQ encapsulation to MPLS encapsulation at an outgoing interface of the VLAN QinQ switching device;
    if the VLAN QinQ switching device is at downstream, assigning a MPLS label with the same range as VLAN labels to the upstream MPLS device by the VLAN QinQ switching device, identifying the MPLS label at the incoming interface of the VLAN QinQ switching device, and treating the label as a VLAN label, with the upstream MPLS device not modified; or
    assigning a VLAN label to the upstream MPLS device by the VLAN QinQ switching device, with the upstream MPLS device modified to support the VLAN QinQ encapsulation.

2. The method for implementing a VLL according to claim 1, wherein
    the VLAN label stack is configured into a structure with one layer; or
    the VLAN label stack is configured into a structure with two or more layers, with labels in the outermost two layers in VLAN QinQ format and labels in other layers in MPLS format.

3. The method for implementing a VLL according to claim 1, wherein in the step of extending an LDP to support encapsulation of VLAN labels, so as to carry out VLAN label assignment and take the extended LDP as a topology discovery protocol for an L2 virtual private network, a VLAN label type length value used to carry the VLAN label is set in a label map message, so as to assign a VLAN label to an upstream device.

4. The method for implementing a VLL according to claim 1, wherein identical VLAN labels entering via different interfaces are treated as different labels.

5. The method for implementing a VLL according to claim 1, wherein the VLAN QinQ switching device notifies a neighboring device that it is a VLAN QinQ switching device by adding a session parameter carrying a VLAN label range used by the VLAN QinQ switching device in an LDP initialization message.

6. The method for implementing a VLL according to claim 5, wherein after LDP initialization, the VLAN QinQ switching device assigns a VLAN label value within the set range when assigning a VLAN label to the neighboring device.

7. The method for implementing a VLL according to claim 1, wherein in the step of setting the range of VLAN labels, the VLAN label range setting is implemented by adding a VLAN label request object that carries the VLAN label range value in a Resource Reservation Protocol-Traffic Engineering PATH message.

8. The method for implementing a VLL according to claim 1, wherein in the step of implementing a VLL by constructing a VLAN switching path, the VLAN switching path is constructed with a tunnel multiplexing mechanism.

* * * * *